(12) United States Patent
Akimoto (10) Patent No.: US 10,216,463 B2
(45) Date of Patent: Feb. 26, 2019

(54) POINT CARD MANAGEMENT SYSTEM

(71) Applicant: KYOCERA Document Solutions Inc., Osaka-shi, Osaka (JP)

(72) Inventor: Tadaaki Akimoto, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 15/609,059

(22) Filed: May 31, 2017

(65) Prior Publication Data

US 2017/0344317 A1    Nov. 30, 2017

(30) Foreign Application Priority Data

May 31, 2016 (JP) ................. 2016-109050

(51) Int. Cl.
| | |
|---|---|
| H04N 1/04 | (2006.01) |
| G06F 3/12 | (2006.01) |
| H04N 1/00 | (2006.01) |
| H04N 1/44 | (2006.01) |
| G06F 21/32 | (2013.01) |
| G06Q 30/02 | (2012.01) |

(52) U.S. Cl.
CPC .......... G06F 3/1222 (2013.01); G06F 3/1203 (2013.01); G06F 3/125 (2013.01); G06F 3/1239 (2013.01); G06F 3/1285 (2013.01); H04N 1/00244 (2013.01); H04N 1/00331 (2013.01); H04N 1/442 (2013.01); *G06F 21/32* (2013.01); *G06Q 30/0226* (2013.01); *H04N 2201/0094* (2013.01)

(58) Field of Classification Search
CPC ........... H04N 1/00244; H04N 1/00331; H04N 1/442; H04N 2201/0094
USPC ....................................................... 358/1.14
See application file for complete search history.

(56) References Cited

U.S. PATENT DOCUMENTS

| | | | | |
|---|---|---|---|---|
| 8,225,375 | B2 * | 7/2012 | Tsuchiya ................. | G06F 21/34 726/3 |
| 2003/0061099 | A1 * | 3/2003 | Watanabe .............. | G06Q 20/06 705/14.28 |
| 2006/0089875 | A1 * | 4/2006 | Park ....................... | G06Q 30/02 705/14.23 |

(Continued)

FOREIGN PATENT DOCUMENTS

| | | |
|---|---|---|
| JP | 2003-036260 A | 2/2003 |
| JP | 2007-060269 A | 3/2007 |

*Primary Examiner* — Houshang Safaipour
(74) *Attorney, Agent, or Firm* — Viering, Jentschura & Partner mbB (57) ABSTRACT

A point card management system includes a multifunction peripheral that processes an image and a server that is connectable to the multifunction peripheral via a network. The multifunction peripheral includes a read request receiving unit, an image read control unit, and a description information acquisition unit. The description information acquisition unit acquires description information of the point card from the image of the point card read by the image reading unit. The server includes a server hard disk and an extraction unit. The extraction unit extracts the accumulation information of the point card from pieces of information of the point card, which have been stored in the server hard disk, based on the description information of the point card, which has been received.

8 Claims, 8 Drawing Sheets

(56) References Cited

U.S. PATENT DOCUMENTS

2011/0153402 A1* 6/2011 Craig .................. G06Q 20/357
                                                    705/14.27
2016/0253651 A1* 9/2016 Park ..................... G06F 3/0482
                                                    705/39

* cited by examiner

| ACQUISITION INFORMATION OF POINT CARD ||||| 35
|---|---|---|---|---|
| USER NAME | CARD NUMBER | COMPANY NAME | ACQUIRED POINT NUMBER | EXPIRATION DATE |
| X | 111 | Y | 100 | JUNE 30 |
| X | 222 | Z | 500 | MAY 15 |
| X | 333 | W | 50 | AUGUST 31 |

62a — first data row
62b — second data row
62c — third data row

FIG.10

POINT CARD MANAGEMENT SYSTEM

CROSS-REFERENCE TO RELATED APPLICATION

This application claims priority to Japanese Patent Application No. 2016-109050, which was filed May 31, 2016, and is incorporated herein by reference in its entirety.

BACKGROUND

This disclosure relates to a point card management system.

In an image processing device, which is typified by a multifunction peripheral, a photoreceptor is irradiated with light, based on image data, to form an electrostatic latent image on the photoreceptor. Then, after a charged toner is fed onto the formed electrostatic latent image to form a visible image, the toner is transferred to a sheet of paper and is fixed onto the sheet of paper, and the sheet of paper is discharged to the outside of the device, thus performing printing.

In the image processing device, as information management, information of a name card is read and is managed. A technology related to acquisition of name card information from a readout name card has been conventionally known.

A typical known data management device includes a reading unit that reads image data from a document, a by-purpose storage unit that stores the image data read by the reading unit by application purpose of the image data, and an at-storing-time attribute allocation unit that automatically allocates, when the by-purpose storage unit performs storing, an identification ID, a storage area, and a storage format which correspond to the purpose of storing.

Also, a typical known information management system manages a management database in which information related to the description of a print medium is registered, includes a management server configured to enable sharing of information related to a description of the print medium between terminal devices via a network, and provides various types of management services using the information related to the description of the print medium. When the typical known information management system prints and outputs output information extracted from the information related to the description of the print medium which has been registered in the management database, the typical known data management device also outputs identification information onto the print medium on which printing is performed and performs management of the information related to the description of the print medium registered in the management database in accordance with the identification information that is read by scanning the print medium and management of the print medium.

SUMMARY

An point card management system according to the present disclosure includes an image processing device that processes an image and a storage device that is connectable to the image processing device via a network. The point card management system manages information of a point card. The image processing device includes a mounting table, an image reading unit, a printing unit, a read request receiving unit, an image read control unit, a description information acquisition unit, an image processing device transmission control unit, an image processing device reception control unit, a layout generation unit, and a print control unit. When an image of a document is read, the document is placed on the mounting table. The image reading unit reads the image of the document placed on the mounting table. The printing unit forms an image and prints the image on a sheet of paper. The read request receiving unit receives a request for a read of an image of the point card placed on the mounting table from the user. The image read control unit performs a control such that, when the request for a read is received by the read request receiving unit, an image of the point card is read by the image reading unit. The description information acquisition unit acquires description information of the point card from the image of the point card read by the image reading unit. The image processing device transmission control unit performs a control such that the description information of the point card, which has been acquired from the description information acquisition unit, is transmitted to the storage unit via the network. The image processing device reception control unit performs a control such that the description information of the point card, which has been transmitted from the storage unit, is received via the network. The layout generation unit generates a layout of a print image of accumulation information of the point card, which has been received. The print control unit controls the printing unit in accordance with the layout of the print image, which has been generated by the layout generation unit, such that the accumulation information of the point card is printed. The storage device includes a storage unit, a storage device reception control unit, an extraction unit, and a storage device transmission control unit. The storage unit stores information of the point card. The storage device reception control unit performs a control such that the description information of the point card, which has been transmitted from the image processing device, is received via the network. The extraction unit extracts the accumulation information of the point card from pieces of information of the point card, which have been stored in the storage unit, based on the description information of the point card, which has been received. The storage device transmission control unit performs a control such that the accumulation information of the point card, which has been extracted by the extraction unit, is transmitted to the image processing device.

DETAILED DESCRIPTION

Figure 1:
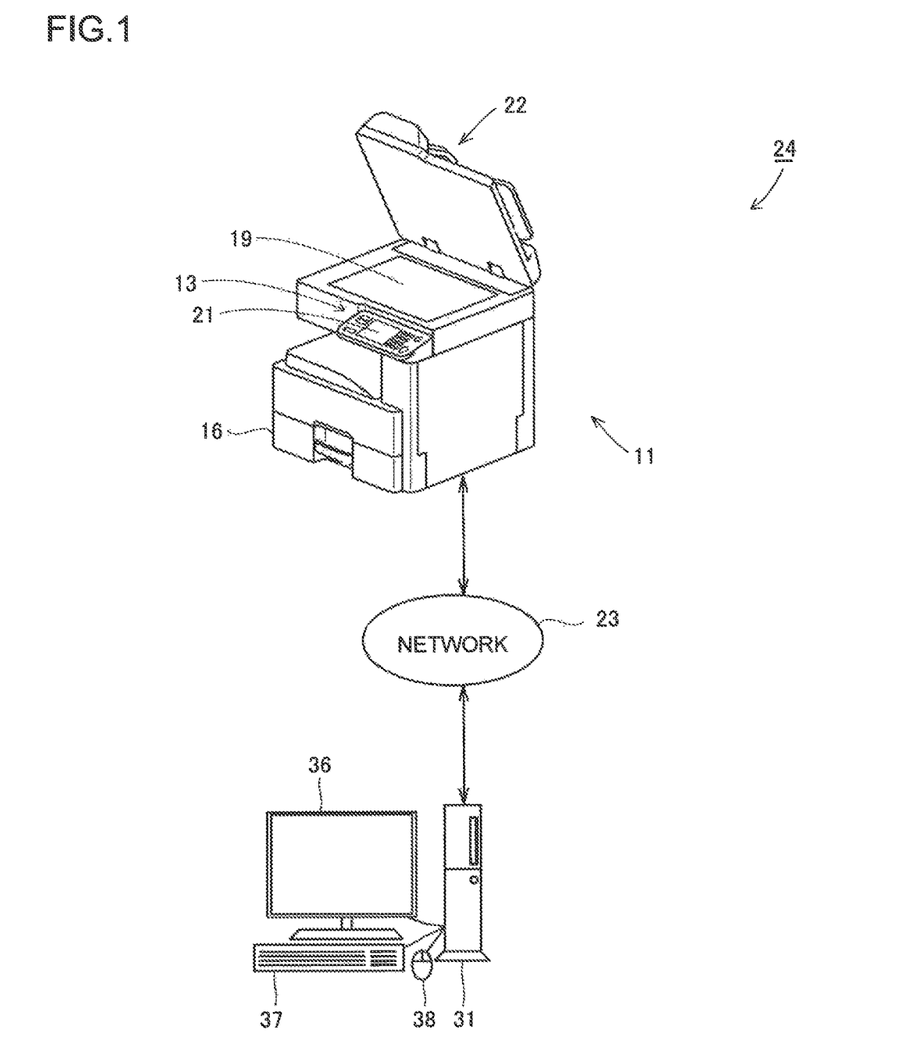
FIG. 1 is a schematic view illustrating an outer appearance of a point card management system according to an embodiment.
Figure 2:
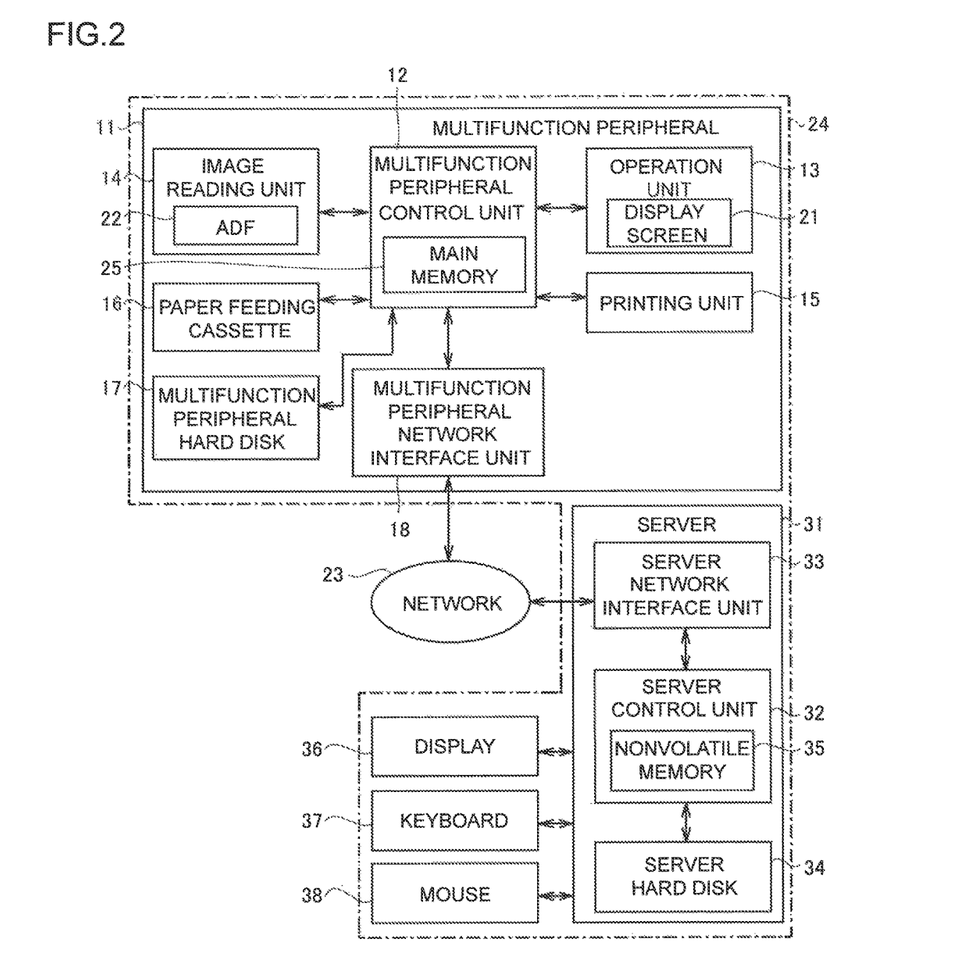
FIG. 2 a block diagram illustrating a configuration of the point card management system illustrated in FIG. 1.

An embodiment will be described below. FIG. 1 is a schematic view illustrating an outer appearance of a point card management system according to the embodiment. FIG. 2 a block diagram illustrating a configuration of the point card management system illustrated in FIG. 1.

With reference to FIG. 1 and FIG. 2, a point card management system 24 that manages information of a point card includes a multifunction peripheral 11 as an image processing device and a server 31 that is coupled to the multifunction peripheral 11 via a network 23. When the multifunction peripheral 11 is installed in a convenience store or the like, the network 23 functions as the Internet.

Next, a configuration of the multifunction peripheral 11 will be described. The multifunction peripheral 11 includes a plurality of functions, such as a copying function, a printer function, a facsimile function, or the like, in relation to image processing. The multifunction peripheral 11 includes a multifunction peripheral control unit 12, an operation unit 13, an image reading unit 14, a printing unit 15, a paper feeding cassette 16, a multifunction peripheral hard disk 17, a multifunction peripheral network interface unit 18 that is used for coupling with the network 23, and a mounting table 19 on which, when an image of a document is read by the image reading unit 14, the document is placed.

The multifunction peripheral control unit 12 performs control of the entire multifunction peripheral 11. Note that the multifunction peripheral control unit 12 includes a main storage memory 25 that temporarily stores data. The operation unit 13 includes a touch panel type display screen 21 as a display unit that displays information transmitted from the multifunction peripheral 11 and input contents of a user. The operation unit 13 receives an input related to image forming, which is, for example, a condition, such as the number of print copies, gradation, or the like, for image forming, from the user. The image reading unit 14 includes an auto document feeder (ADF) 22 as a document conveyance device that conveys a document set in a set position to a reading position. The image reading unit 14 reads an image of the document set on the ADF 22 or placed on the mounting table 19. As the paper feeding cassette 16, a plurality of paper feeding cassettes 16 is provided and each of the plurality of paper feeding cassettes 16 is capable of storing a plurality of sheets of paper therein. The printing unit 15 forms an image on a sheet of paper that has been conveyed from the paper feeding cassettes 16 or the like, based on image data read by the image reading unit 14 or image data transmitted via the network 23, and performs printing. The multifunction peripheral hard disk 17 stores data, such as the transmitted image data, the input image forming condition, or the like, which is related to image forming. The mounting table 19 is formed of a transparent glass plate member and a document an image of which is read is placed on the mounting table 19. The mounting table 19 is configured such that a point card, which will be described later, may be placed thereon. In this case, a plurality of point cards may be arranged thereon.

Next, a configuration of the server 31 will be described. The server 31 is configured to be connectable to the multifunction peripheral 11 via the network 23. A display 36, a keyboard 37, and a mouse 38 are coupled to the server 31. Information or data transmitted from the server 31 is displayed by the display 36. Also, the user inputs data to the server 31 using the keyboard 37 or the mouse 38.

The server 31 includes a server control unit 32, a server network interface unit 33 that is used for coupling with the network 23, a server hard disk 34 as a storage unit, and a nonvolatile memory 35 that temporarily stores data. The server control unit 32 controls the server 31. The server hard disk 34 is a so-called database and stores received image data, input data, or the like.

Specifically, information of a point card is stored in the server hard disk 34. For a point card specified by a user name, a card number, or a company name, the information of the point card includes information of the user name or the card number, information of a company that issues the point card, or furthermore, information related to the number of acquired points accumulated in the point card or the expiration date of the points. The server 31 is managed by a management company that issues the point card and the information of the point card is updated to the latest information at all times.

Figure 3:
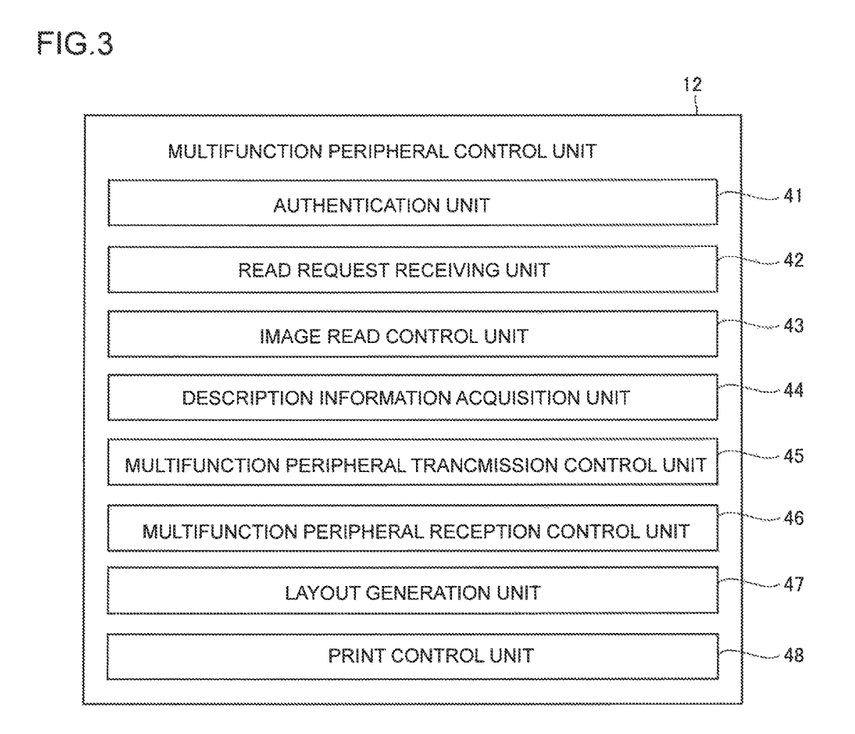
FIG. 3 is a block diagram illustrating a configuration of a multifunction peripheral control unit.

Next, a configuration of the multifunction peripheral control unit 12 of the multifunction peripheral 11 will be described. FIG. 3 is a block diagram illustrating a configuration of the multifunction peripheral control unit 12. With reference to FIG. 3, the multifunction peripheral control unit 12 includes an authentication unit 41, a read request receiving unit 42, an image read control unit 43, a description information acquisition unit 44, a multifunction peripheral transmission control unit 45 as an image processing device transmission control unit, a multifunction peripheral reception control unit 46 as an image processing device reception control unit, a layout generation unit 47, and a print control unit 48. The authentication unit 41 authenticates a user from whom a request for a read has been received by the read request receiving unit 42. The read request receiving unit 42 receives a request for a read of an image from a user of a point card placed on the mounting table 19. That is, a document in this case is the point card. When the read request receiving unit 42 receives a request for a read, the image read control unit 43 performs a control such that an image of the point card is read by the image reading unit 14. The description information acquisition unit 44 acquires the description information of the point card from the image of the point card that has been read by the image reading unit 14. The multifunction peripheral transmission control unit 45 performs a control such that the description information of the point card, which has been acquired from the description information acquisition unit 44, is transmitted to the server 31 via the network 23. The multifunction peripheral reception control unit 46 performs a control such that the accumulation information of the point card, which has been transmitted from the server 31, is received via the network 23. The layout generation unit 47 generates a layout of a print image of the accumulation information of the point card, which has been received. The print control unit 48 controls the printing unit 15 such that the accumulation information of the point card is printed in accordance with the layout of the print image, which has been generated by the layout generation unit 47. Configurations of the above-described units will be described later.

Figure 4:
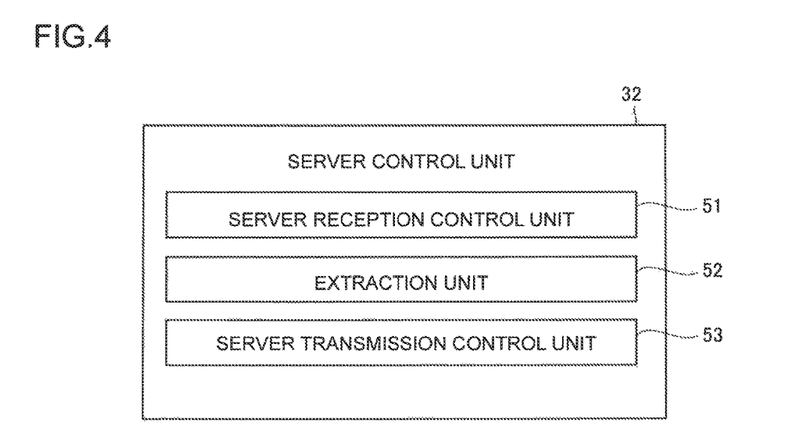
FIG. 4 is a block diagram illustrating a configuration of a server control unit.

Next, a configuration of the server control unit 32 of the server 31 will be described. FIG. 4 is a block diagram illustrating a configuration of the server control unit 32. With reference to FIG. 4, the server control unit 32 includes a server reception control unit 51 as a storage device reception control unit, an extraction unit 52, and a server transmission control unit 53 as a storage device transmission control unit.

The server reception control unit 51 performs a control such that the description information of the point card, which has been transmitted from the multifunction peripheral 11 via the network 23, is received. The extraction unit 52 extracts the accumulation information of the point card from pieces of information of the point card, which are stored in the server hard disk 34, based on the description information of the point card, which has been received via the network 23. The server transmission control unit 53 performs a control such that the accumulation information of the point card, which has been extracted by the extraction unit 52, is transmitted to the multifunction peripheral 11. Configurations of the above-described units will be described later.

Figure 5:
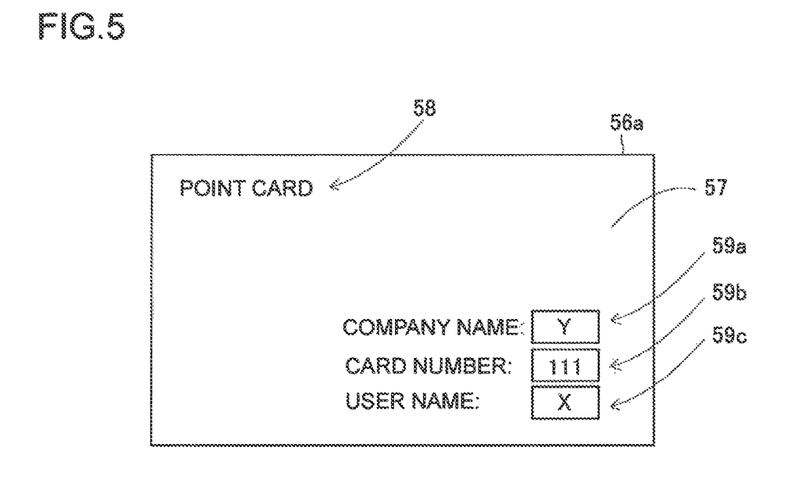
FIG. 5 is a view illustrating an example of a surface of a point card.

First, a configuration of the point card will be briefly described. FIG. 5 is a view illustrating an example of a surface of the point card. With reference to FIG. 5, a description 58 of "POINT CARD", a description of 59a of "COMPANY NAME: Y" indicating the company name of an issuance source, a description 59b of "CARD NUMBER: 111" indicating the card number, and a description 59c of "USER: X" indicating the user name are provided on a surface 57 of a point card 56a. The descriptions 58 and 59a to 59c may be known by reading the image by the image reading unit 14.

Figure 6:
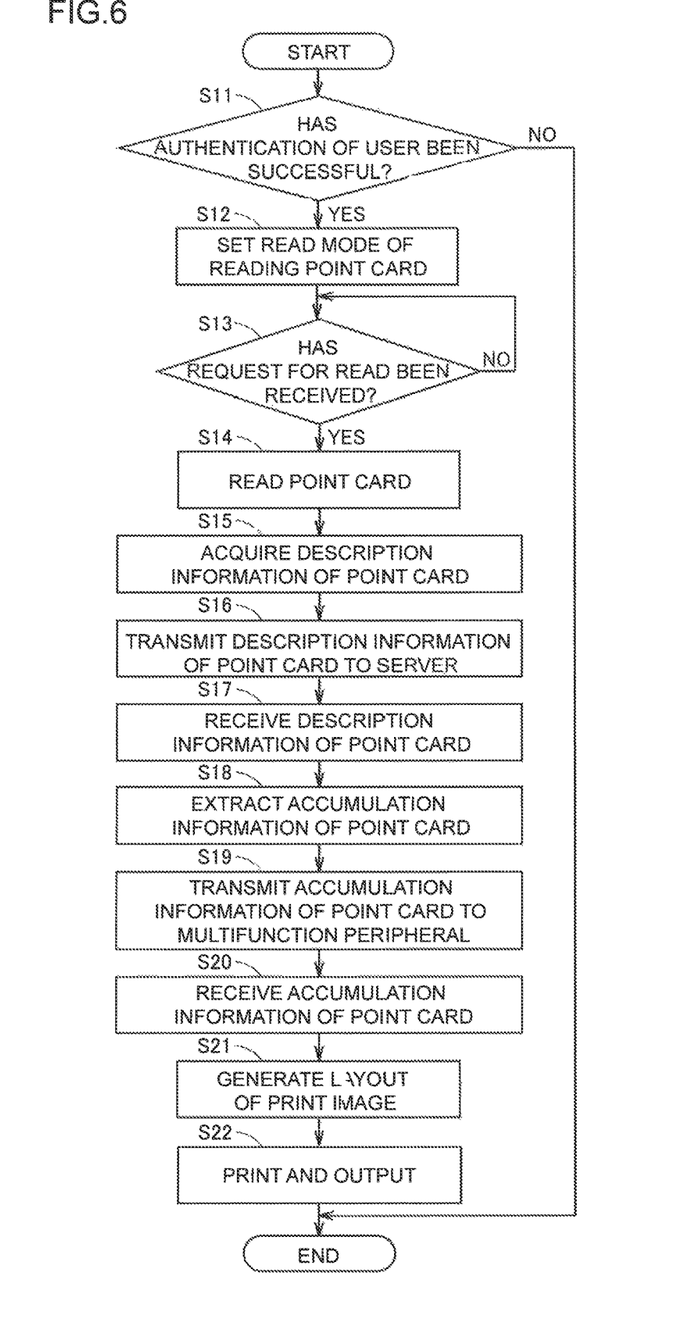
FIG. 6 is a flowchart illustrating a flow of processing when accumulation information of a point card is acquired using the point card management system.

Next a case where, using the point card management system 24, the accumulation information of the point card is acquired will be described. FIG. 6 is a flowchart illustrating a flow of processing when accumulation information of a point card using the point card management system 24. A case where the user X owns the point card 56a the company name of which is "Y" and the card number of which is "111", a point card 56b the company name of which is "Z" and the card number of which is "222", and a point card 56c the company name of which is "W" and the card number of which is "333" and the accumulation information of each of the point cards 56a to 56c is acquired will be described below. The company name herein is the name of a company that issued the corresponding one of the point cards 56a to 56c.

With reference to FIG. 6, the user X visits a place where the multifunction peripheral 11 is installed and performs user authentication (in FIG. 6, Step S11, and "Step" will be hereinafter omitted). In this case, a method for authentication performed by the authentication unit 41 is not particularly limited, for example, authentication may be performed by displaying a login screen on the display screen 21 to urge the user X to input a user ID and a password, and thus, determining whether an input is correct or wrong, or authentication may be performed by merely determining whether the password is correct or wrong. Then, if the authentication performed by the authentication unit 41 has been successful (YES in S11), a read mode of reading the point cards 56a to 56c is set (S12). This setting is performed via the display screen 21 of the operation unit 13. Note that, if authentication of the user has been not successful (NO in S11), the image read control unit 43 performs a control such that the image of the point card is not read by the image reading unit 14, and then, the process ends.

The user X sets the read mode, and then, places the three point cards 56a, 56b, and 56c on the mounting table 19. In this case, the point cards 56a to 56c are placed not to overlap one another such that the surface 57 of each of the point cards 56a to 56c faces toward the inner side of the multifunction peripheral 11.

Figure 7:
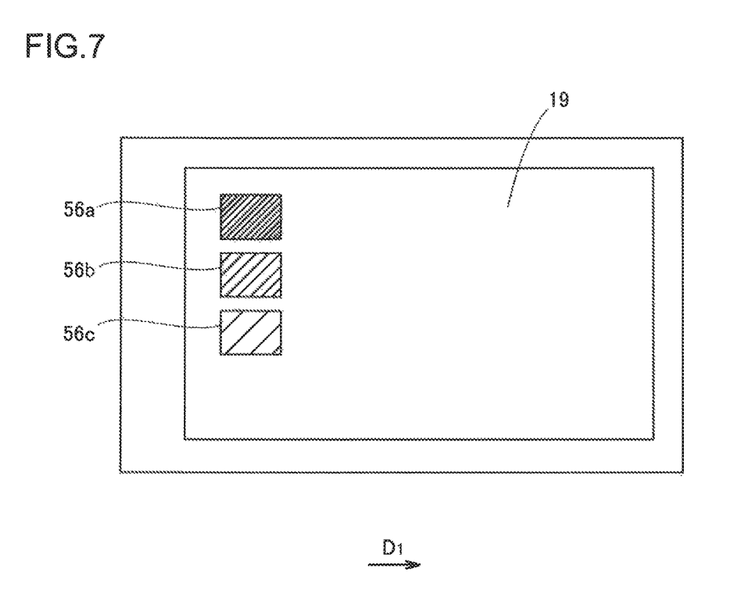
FIG. 7 is a view illustrating a state of each of three point cards placed on a mounting table.

FIG. 7 is a view illustrating a state of each of the three point cards 56a to 56c placed on the mounting table 19. With reference to FIG. 7, the three point cards 56a to 56c are placed on the mounting table 19 such that the surface 57 faces toward the inner side of the multifunction peripheral 11. The point cards 56a, 56b, and 56c are placed in this order from an upper side.

Thus, the point cards 56a to 56c are placed and a press-down of a start key of the operation unit 13 is detected. That is, when the read request receiving unit 42 receives a request for a read of an image of each of the point cards 56a to 56c placed on the mounting table 19 from the user (YES in S13), the image read control unit 43 performs a control such that the image of the surface 57 of each of the point cards 56a to 56c is read by the image reading unit 14 (S14). In this case, scanning is performed while moving a reading unit (not illustrated) in a direction indicated by an arrow D1 in FIG. 7 to read the image of the surface 57 of each of the point cards 56a to 56c.

Thereafter, the description information acquisition unit 44 acquires the description information of each of the point cards 56a to 56c from the corresponding one of the images of the point cards 56a to 56c read by the image reading unit 14 (S15). Specifically, the company name and the card number of each of the point cards 56a to 56c of the user X and the name of the user X are acquired from the corresponding one of the images of the surfaces of the point cards 56a to 56c. In this case, the acquired description information is temporarily stored in the main storage memory 25.

Figure 8:
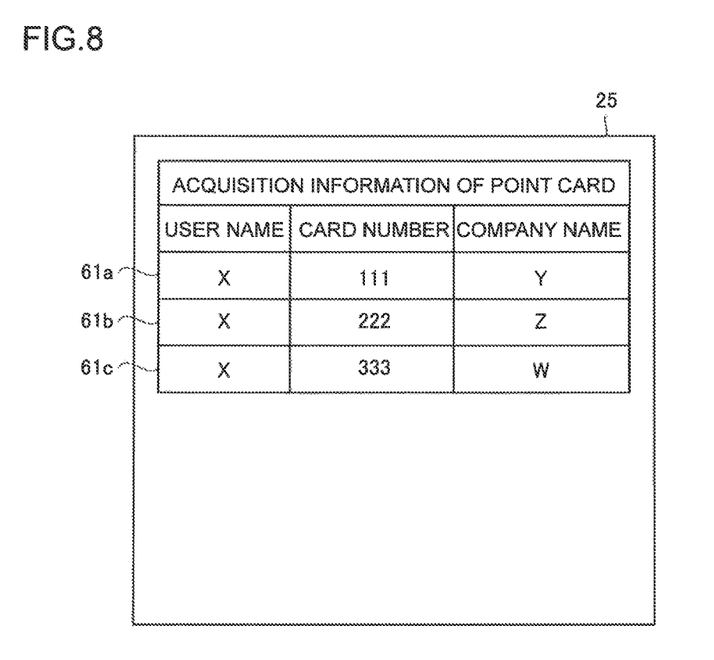
FIG. 8 is a conceptual diagram illustrating an example of description information of three point cards stored in a main storage memory.

FIG. 8 is a conceptual diagram illustrating an example of description information of each of the three point cards 56a to 56c stored in the main storage memory 25. With reference to FIG. 8, the description information 61a, the description information 61b, and the description information 61c of the point cards 56a, 56b, and 56c are stored in the main storage memory 25.

Next, the multifunction peripheral transmission control unit 45 performs a control such that the description information 61a, the description information 61b, and the description information 61c of the point cards 56a, 56b, and 56c, which have been acquired by the description information acquisition unit 44, are transmitted to the server 31 via the network 23 (S16).

The description information 61a, the description information 61b, and the description information 61c of the point cards 56a, 56b, and 56c, which have been transmitted via the network 23, are received by the server reception control unit 51 (S17).

Thereafter, the extraction unit 52 provided in the server 31 extracts accumulation information of each of the point cards 56a to 56c from the pieces of information of the point cards 56a to 56c, which are stored in the server hard disk 34, based on the description information 61a, the description information 61b, and the description information 61c that have been received (S18). The accumulation information of each of the point cards 56a to 56c is temporality stored in the nonvolatile memory 35.

Figure 9:
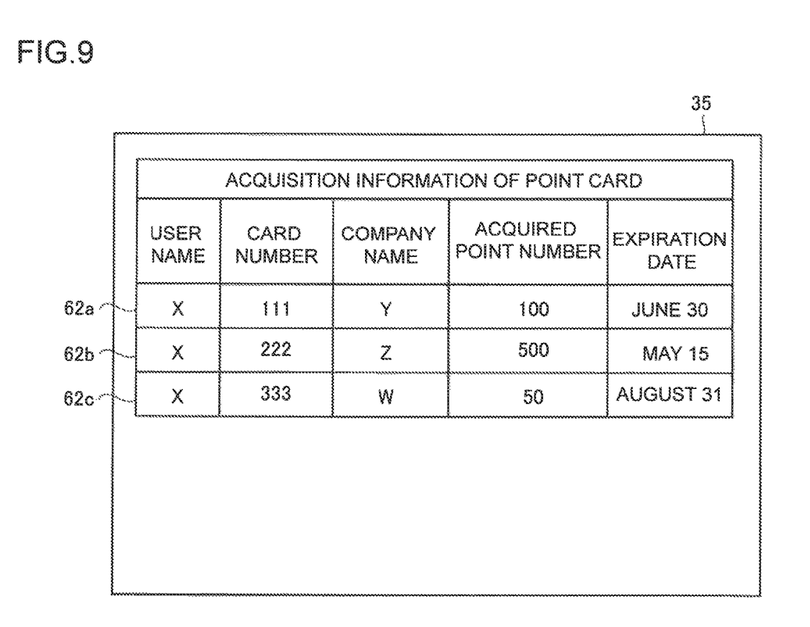
FIG. 9 is a conceptual diagram illustrating an example of accumulation information of three point cards stored in a nonvolatile memory.

FIG. 9 is a conceptual diagram illustrating an example of accumulation information of each of the three point cards 56a to 56c stored in the nonvolatile memory 35. With reference to FIG. 9, accumulation information 62a, accumulation information 62b, and accumulation information 62c of the point cards 56a, 56b, and 56c are stored in the nonvolatile memory 35.

The accumulation information 62a of the point card 56a is information that includes, in addition to "X" as the user name, "111" as the card number, and "Y" as the company name, "100" as the acquired point number and "JUNE 30" as the expiration date. The accumulation information 62b of the point card 56b is information that includes, in addition to "X" as the user name, "222" as the card number, and "Z" as the company name, "500" as the acquired point number and "MAY 15" as the expiration date. The accumulation information 62c of the point card 56c is information that includes, in addition to "X" as the user name, "333" as the card number, and "W" as the company name, "50" as the acquired point number and "AUGUST 31" as the expiration date.

Thereafter, the server transmission control unit 53 transmits the accumulation information 62a, the accumulation information 62b, and the accumulation information 62c of the point cards 56a, 56b, and 56c to the multifunction peripheral 11 side (S19). As a matter of course, also in this case, transmission is performed via the network 23.

Thus, the multifunction peripheral reception control unit 46 performs a control such that the accumulation information 62a, the accumulation information 62b, and the accumulation information 62c of the point cards 56a, 56b, and 56c, which have been transmitted, are received (S20). Then, the layout generation unit 47 generates a layout of a print image, based on the accumulation information 62a, the accumulation information 62b, and the accumulation information 62c of the point cards 56a, 56b, and 56c, which have been received (S21). Thereafter, the print control unit 48 causes the printing unit 15 to perform printing, based on the layout of the print image, which has been generated, and outputs a printed material (S22).

Figure 10:
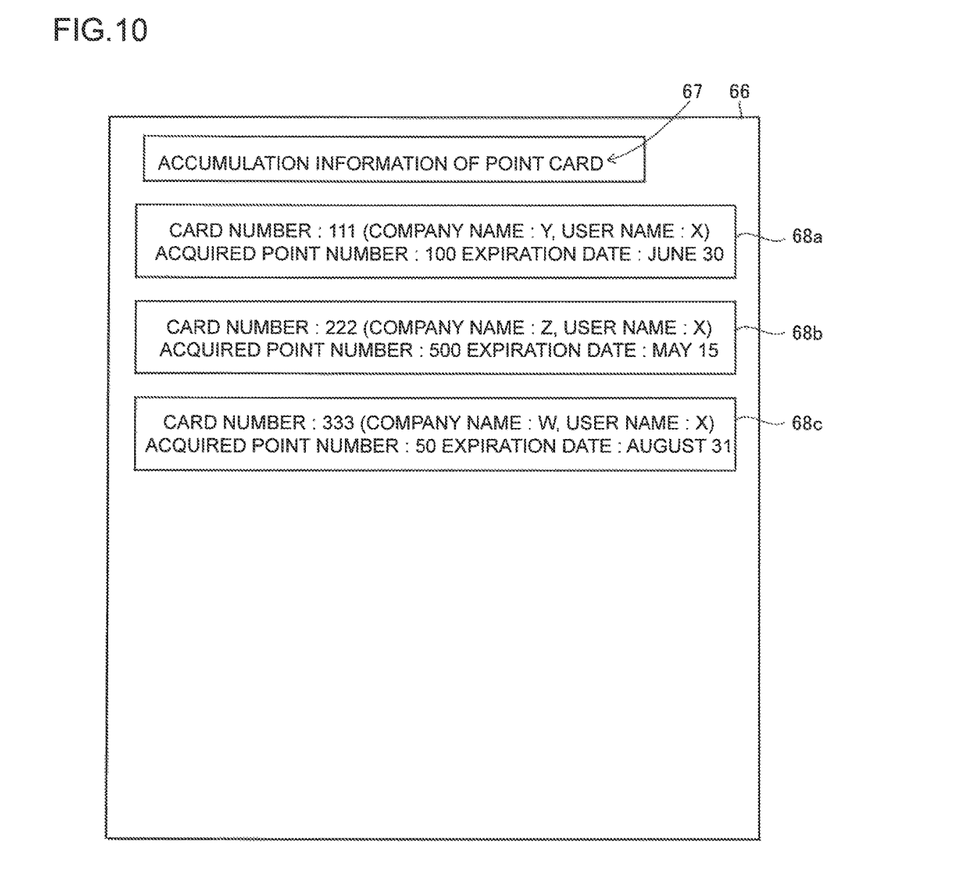
FIG. 10 is a view illustrating an example of a printed material that has been output.

FIG. 10 is a view illustrating an example of a printed material 66 that has been output. With reference to FIG. 10, the printed material 66 includes a description 67 of "ACCUMULATION INFORMATION OF POINT CARD" and respective descriptions 68a, 68b, and 68c related to the accumulation information 62a, the accumulation information 62b, and the accumulation information 62c of the point cards 56a to 56c. Specifically, in the description 68a, "CARD NUMBER: 111 (COMPANY NAME: Y, USER NAME: X) ACQUIRED POINT NUMBER: 100 EXPIRATION DATE: JUNE 30" is indicated. In the description 68b, "CARD NUMBER: 222 (COMPANY NAME: Z, USER NAME: X) ACQUIRED POINT NUMBER: 500 EXPIRATION DATE: MAY 15" is indicated. In the description 68c, "CARD NUMBER: 333 (COMPANY NAME: W, USER NAME: X) ACQUIRED POINT NUMBER: 50 EXPIRATION DATE: AUGUST 31" is indicated.

The user X looks at the printed material 66 that has been output to know, for example, that the expiration date of the point card 56b is the closest and that the acquired point number of points acquired by the point card 56b is the largest. Then, use of the point card 56b by the user X is promoted.

As has been described above, with the point card management system 24, pieces of information of a plurality of point cards are read, the acquired point number or the expiration date of each of the plurality of point cards is printed, and a printed material is output. Thus, even when the user does not manage his or her the point card by himself or herself, the user is able to easily know the acquired point number or the expiration date, so that expiration of points may be avoided or points may be effectively used. Therefore, effective use of points of the point card owned by the user may be easily promoted.

In this case, the authentication unit 41 authenticates a user from whom a request for a read has been received by the read request receiving unit 42 and, if authentication of the user performed by the authentication unit 41 has not been successful, the image read control unit 43 performs a control such that an image of the point card is not read by the image reading unit 14. Thus, a higher level of security may be ensured.

Note that the following configuration may be employed. That is, the multifunction peripheral 11 further includes a storage unit that stores information of a user from whom a request for a read has been received by the read request receiving unit 42 and a determination unit that determines whether or not the user from whom the request for a read has been received by the read request receiving unit 42 had made a request for a read which was received by the read request receiving unit 42 in the past. Then, if the determination unit has determined that the user had made a request for a read which was received by the read request receiving unit 42 in the past, the extraction unit 52 extracts accumulation information of the point card, based on information of the user, regardless of description information of the point card, which has been acquired by the description information acquisition unit 44. Thus, the user who has made a request for a read of the point card once is able to know the accumulation information of the point card of the user without arranging the point card on the mounting table 19 to perform a read again.

Also, in the above-described embodiment, the authentication unit 41 may be configured to perform authentication by authenticating an image of the face of the user. Specifically, a face photo attached to a driver's license of the user is used to perform authentication. Thus, the level of security may be increased. Also, for example, there may be a case where, when a user that performs an operation is specified, authentication by the authentication unit 41 is not performed.

Note that, in the above-described embodiment, the description information acquisition unit 44 may have a configuration including an optical character recognition (ORC). Thus, for example, a point card on which a user name is written by hand or the like may be also handled.

Also, although, in the above-described, the storage device is the server 31 coupled to the network 23, the storage device is not limited thereto and may be a storage unit on clouding computing. That is, the storage device may be configured to include at least one of a storage unit on a server and a storage unit on cloud computing.

Note that, although, in the above-described embodiment, the description information of the point card includes the information of the company name of a company that issued the point card, the information of the user that owns the point cared, and the information of the card number of the point card, the description information of the point card is not limited thereto and may include some other information.

Also, although, in the above-described embodiment, the accumulation information of the point card includes the information of the point number indicating accumulated points and the information of the expiration date of points, but the accumulation information of the point card is not limited thereto and may include some other information, such as, for example, information of cautions for using points, or the like.

The embodiment and examples disclosed herein are provided merely for illustrative purpose in every respect and are not intended to be limiting in any aspect. The scope of the present disclosure is defined by the scope of claims rather than the above-described description, and is intended to include any modifications within the scope and meaning equivalent to the terms of the claims.

A point card management system according to the present disclosure may be effectively used particularly when a promotion of effective use of points of a point card owned by a user in a simple manner is demanded.

What is claimed is:

1. A point card management system that manages information of a point card, the system comprising:
   an image processing device that processes an image; and
   a storage device that is connectable to the image processing device via a network,
   wherein the image processing device includes
      a mounting table on which, when an image of a document is read, the document is placed,
      an image reading unit that reads the image of the document placed on the mounting table,
      a printing unit that forms an image and prints the image on a sheet of paper,
      a read request receiving unit that receives a request for a read of an image of the point card placed on the mounting table from the user,
      an image read control unit that performs a control such that, when the request for a read is received by the read request receiving unit, an image of the point card is read by the image reading unit,
      a description information acquisition unit that acquires description information of the point card from the image of the point card read by the image reading unit,
      an image processing device transmission control unit that performs a control such that the description information of the point card, which has been acquired from the description information acquisition unit, is transmitted to the storage unit via the network,
      an image processing device reception control unit that performs a control such that the description information of the point card, which has been transmitted from the storage unit, is received via the network,
      a layout generation unit that generates a layout of a print image of accumulation information of the point card, which has been received, and
      a print control unit that controls the printing unit in accordance with the layout of the print image, which has been generated by the layout generation unit, such that the accumulation information of the point information is printed,
   the storage device includes
      a storage unit that stores information of the point card,
      a storage device reception control unit that performs a control such that the description information of the point card, which has been transmitted from the image processing device, is received via the network,
      an extraction unit that extracts the accumulation information of the point card from pieces of information of the point card, which have been stored in the storage unit, based on the description information of the point card, which has been received, and
      a storage device transmission control unit that performs a control such that the accumulation information of the point card, which has been extracted by the extraction unit, is transmitted to the image processing device and
   the mounting table is a table on which the plurality of point cards is arrangeable.

2. The point card management system according to claim 1,
   wherein the image processing device further includes
      an authentication unit that authenticates the user from whom the request for a read has been received by the read request receiving unit, and
      the image read control unit performs a control such that, if authentication of the user, which was performed by the authentication unit, has not been successful, the image of the point card is not read by the image reading unit.

3. The point card management system according to claim 2,
   wherein the authentication unit is performed by authenticating an image of a face of the user.

4. The point card management system according to claim 1,
   wherein the image processing device further includes
      a storage unit that stores the information of the user from whom the request for a read has been received by the read request receiving unit, and
      a determination unit that determines whether or not the user from whom the request for a read has been received by the read request receiving unit had made a request for a read which was received by the read request receiving unit in the past, and
      if the determination unit has determined that the user had made a request for a read which was received by the read request receiving unit in the past, the extraction unit extracts the accumulation information of the point card, based on the information of the user, regardless of the description information of the point card, which has been acquired by the description information acquisition unit.

5. The point card management system according to claim 1,
   wherein the description information of the point card includes information of a management company that issued the point card, information of the user who owns the point card, and information of the number of the point card.

6. The point card management system according to claim 1,
   wherein the accumulation information of the point card includes information of the point number indicating accumulated points and information of an expiration date of the points.

7. The point card management system according to claim 1,
   wherein the description information acquisition unit includes an optical character recognition (OCR).

8. The point card management system according to claim 1,
   wherein the storage device includes at least one of a storage unit on a server and a storage unit on cloud computing.

* * * * *